US006000253A

United States Patent [19]

Daoud

[11] Patent Number: 6,000,253

[45] Date of Patent: Dec. 14, 1999

[54] SLIDING SECURITY OVERRIDE SYSTEM

[75] Inventor: Bassel Hage Daoud, Parsippany, N.J.

[73] Assignee: Lucent Technologies Inc., Murray Hill, N.J.

[21] Appl. No.: 09/107,220

[22] Filed: Jun. 29, 1998

[51] Int. Cl.[6] .............................. F16K 35/00; G05G 5/00

[52] U.S. Cl. ............................ 70/175; 292/148; 292/283; 292/104; 292/128; 70/465; 70/2

[58] Field of Search .................................... 292/177, 179, 292/148, 149, 283, 150, 104, 105, 128, 175, 155, DIG. 65; 70/465, 160, 161, 162, DIG. 63, 12, 2; 379/399, 445

[56] References Cited

U.S. PATENT DOCUMENTS

| | | | |
|---|---|---|---|
| 1,806,031 | 10/1931 | Vignos | 70/DIG. 63 |
| 1,961,041 | 5/1934 | Gilbert, Jr. | 292/148 |
| 2,825,218 | 3/1958 | O'Brien | 70/7 |
| 3,572,062 | 3/1971 | Beebe | 70/1.5 |
| 3,889,498 | 6/1975 | Harrell | 70/78 |
| 3,926,018 | 12/1975 | Joersz | 70/19 |
| 3,938,837 | 2/1976 | Bright | 292/149 |
| 4,085,599 | 4/1978 | Fischer et al. | 70/14 |
| 4,229,956 | 10/1980 | Thorburn | 70/129 |
| 4,290,281 | 9/1981 | Knaack et al. | 70/54 |
| 4,782,675 | 11/1988 | Thorburn | 70/129 |
| 5,076,078 | 12/1991 | Weger, Jr. | 70/54 |
| 5,092,143 | 3/1992 | Rumbles | 70/56 |
| 5,312,266 | 5/1994 | Daoud | 439/304 |
| 5,315,849 | 5/1994 | Georgopoulos | 70/34 |
| 5,497,416 | 3/1996 | Butler, III et al. | 379/399 |
| 5,740,685 | 4/1998 | Daoud | 70/164 |
| 5,743,116 | 4/1998 | Suster | 70/14 |

*Primary Examiner*—Darnell M. Boucher
*Assistant Examiner*—John B. Walsh

[57] ABSTRACT

A security override system for a locked box comprising a first hasp portion mounted within a box and extending through an outer door of the box; a second hasp portion connected to a bracket; the bracket slideably mounted within the box such that the second hasp portion extends through an opening in the outer door; the bracket being movable between a closed position wherein the second hasp portion mates with the first hasp portion to form a padlock receiving section and an open position wherein the second hasp portion does not mate with the first hasp portion; and wherein the outer door can be opened by moving the bracket into the open position and removing a locked padlock inserted in the padlock receiving section without first unlocking the padlock.

21 Claims, 5 Drawing Sheets

SLIDING SECURITY OVERRIDE SYSTEM

FIELD OF THE INVENTION

This invention relates to a security system for use with a junction box, a Building Entrance Protector, or other enclosure, and in particular, to a sliding security override system for permitting access to the enclosure when padlocked, without the need to unlock the padlock.

BACKGROUND OF THE INVENTION

Junction boxes have long been used to collect and protect telephone and electrical wires for distribution, splicing, cross connection and other uses. In the telephony arts, such junction boxes are more commonly known as network interface units (NIUs) and/or building entrance protectors (BEPs).

In a telephone network, a network cable from the central office is connected to a BEP located at the customer site, where the individual telephone lines are broken out line by line. The network cable, which consist of a plurality of tip-ring wire pairs that each represent a telephone line, is typically connected to a connector block that is an integral part of the BEP. Such connectors may be, for example, the ubiquitous 66-type punch down connector, or an SC 99 type connector block, such as are available from Lucent Technologies Inc. The customer telephone equipment is coupled through the connector block to a central office (CO) telephone line. The CO line side of the connector is generally the bottom side of the connector block, where the CO line tip-ring wire pairs are connected using a wire-wrapping tool.

The BEP generally has a lockable outer door to prevent unauthorized access to the components inside. The outer door is generally secured by a keyed or combination type padlock, and the building owner retains possession of the only key (or combination). Frequently, it is necessary for others in addition to the building owner to open the BEP for servicing or maintenance, for example, telephone company technicians or contractors acting in their capacity. Such servicing will at times occur during non-business hours or at other times when the building owner cannot be located or is not available. If the building owner is not available the technician wishing to service the BEP would not be able to do so because the building owner has the only key to the padlock. The technician would then have to come back at a later date when the building owner was available, which is both inconvenient to the technician, and costly to the building owner and their customers. Also, if the key or combination to the padlock was lost, it would be necessary to saw off the padlock in order to access the components within the BEP. Accordingly, a mechanism for overriding the padlock is desired, while at the same time maintaining the appearance of a secure, locked utility box.

SUMMARY OF THE INVENTION

The present invention provides a security override mechanism for accessing the components within a padlocked utility box without having to first unlock the padlock, while at the same time maintaining the appearance of a secure, locked utility box.

The mechanism consists of a one-sided hasp portion connected to a U-shaped bracket. The hasp portion is at the approximate center of the longitudinal length of the bracket and extends substantially perpendicular to the longitudinal length of the bracket. The bracket, and hasp portion connected thereto, is slideably mounted to the inside of the outer door of the utility box, and the hasp portion of the bracket extends through the outer door of the utility box. The hasp portion is slideable between a closed position and an open position. The bracket has two oval cutouts to accept two corresponding guide bolts which are attached to the inside surface of the outer door. The bracket, and corresponding hasp portion, is guided between its open and closed positions by the interaction of the guide bolts and the corresponding oval cutouts. A spring is attached to the inside of the outer door at one end of the bracket. The spring biases the hasp portion towards its closed position. A security screw, for example a KS/216 screw, is mounted on the outer door of the utility box. The screw extends through an opening in the outer door and an opening in the bracket and has a contacting nut, a washer and a lock nut on the far side. The security screw can be loosened whereby the bracket is slideably movable, or the security screw can be tightened whereby the bracket is immovable.

An oppositely facing one-sided fixed hasp portion is fixedly mounted to a wall within the utility box and extends through an opening in the outer door of the utility box to mate with the one-sided sliding hasp portion connected to the bracket. When the sliding hasp portion is in its open position, there is a gap between the sliding hasp portion and the fixed hasp portion such that a locked padlock can pass between them for removal. When the sliding hasp portion is in its closed position, it mates with the fixed hasp portion to form a fully closed hasp with an opening to receive a padlock, just as in a conventional padlock hasp. Thus, when the outer door is closed and the sliding hasp portion is in its closed position mating with the fixed hasp portion, an unlocked padlock may be inserted through the opening and locked, preventing the door from opening. When the sliding hasp portion is in its closed position and the padlock is installed, it would appear as though the outer door cannot be opened without first unlocking and removing the padlock.

By turning the security screw and loosening it, the contacting nut no longer tightly contacts the bracket and thus the bracket and sliding hasp portion are slideably movable between their open and closed positions. Thus, although the spring biases the bracket and hasp portion to their closed position, by loosening the security screw the bracket and hasp portion are rendered movable, allowing the hasp portion to be separated from the fixed hasp portion, whereupon a locked padlock can be removed and the outer door can be opened without first unlocking the padlock. When the security screw is tightened, the contacting nut contacts the bracket and frictionally maintains the bracket in its closed position such that the outer door can only be opened by unlocking and removing the padlock (or cutting the padlock off).

Thus, while the utility box looks as though it cannot be opened without unlocking the padlock, the technician or other authorized user knowledgeable in its construction can open the utility box without first unlocking the padlock. Also, should the key to the padlock become lost, the building owner can open the utility box without having to cut off the padlock.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

DESCRIPTION OF THE DRAWING FIGURES

In the drawing figures, which are not to scale, and which are merely illustrative, and wherein like reference numerals depict like elements throughout the several views.

DETAILED DESCRIPTION OF THE PREFERRED EMBODIMENTS

Figure 1B:
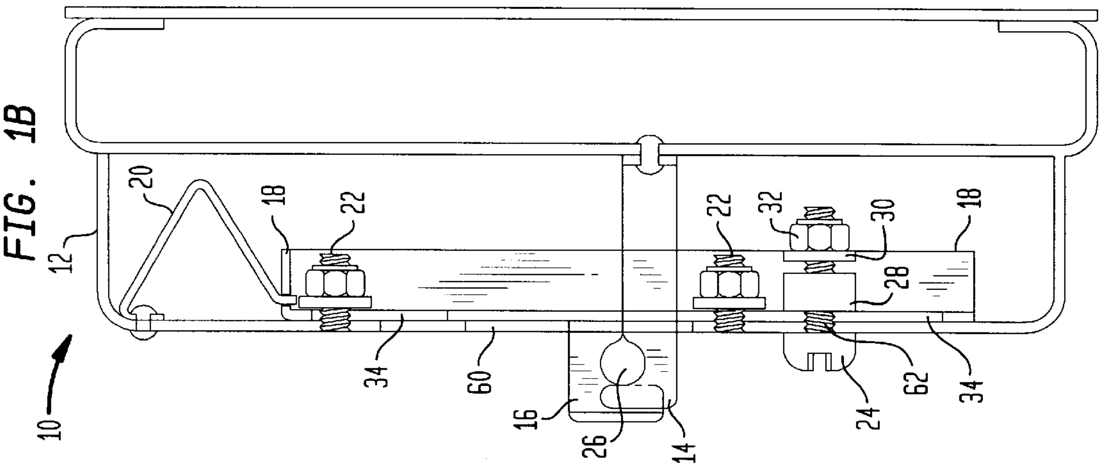
FIG. 1B is a side elevational cutaway view of the sliding security override system depicted in FIG. 1A.
Figure 1A:
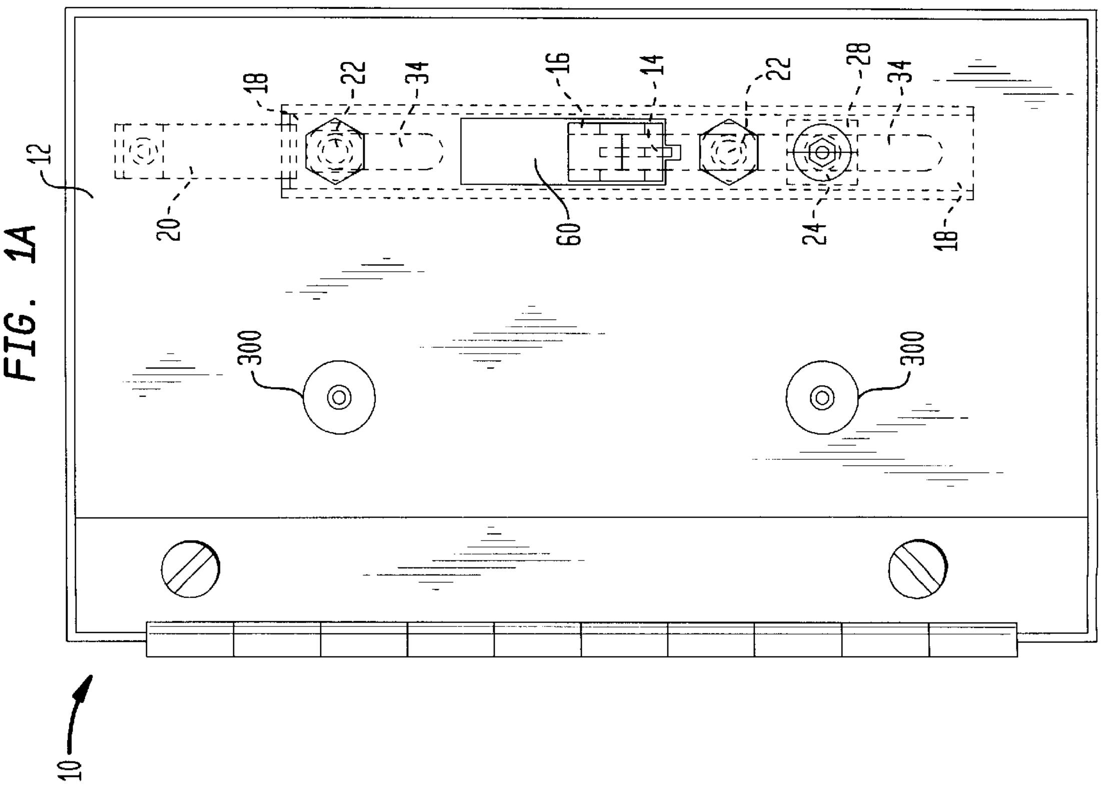
FIG. 1A is a front elevational view of the sliding security override system constructed in accordance with a preferred embodiment of the present invention mounted to a utility box and with the system in its closed position.
Figure 2B:
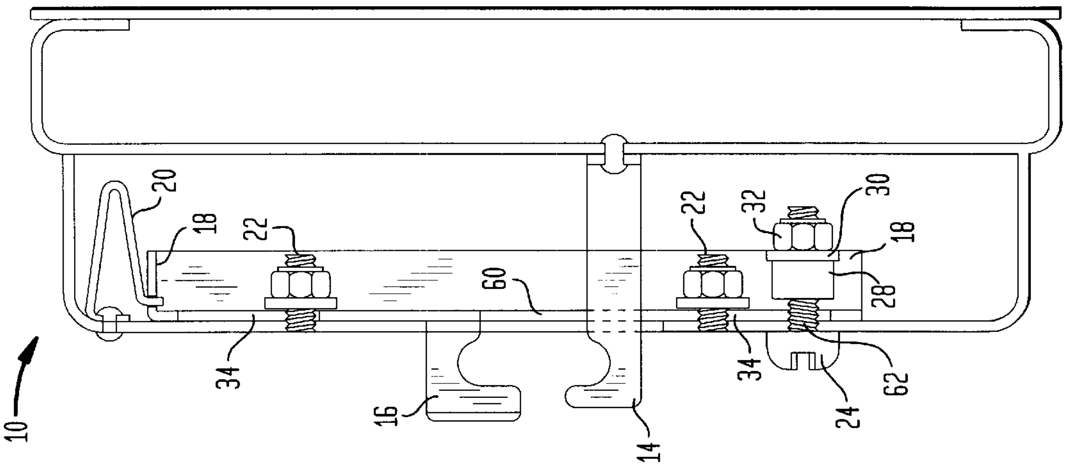
FIG. 2B is a side elevational cutaway view of the sliding security override system depicted in FIG. 2A.
Figure 2A:
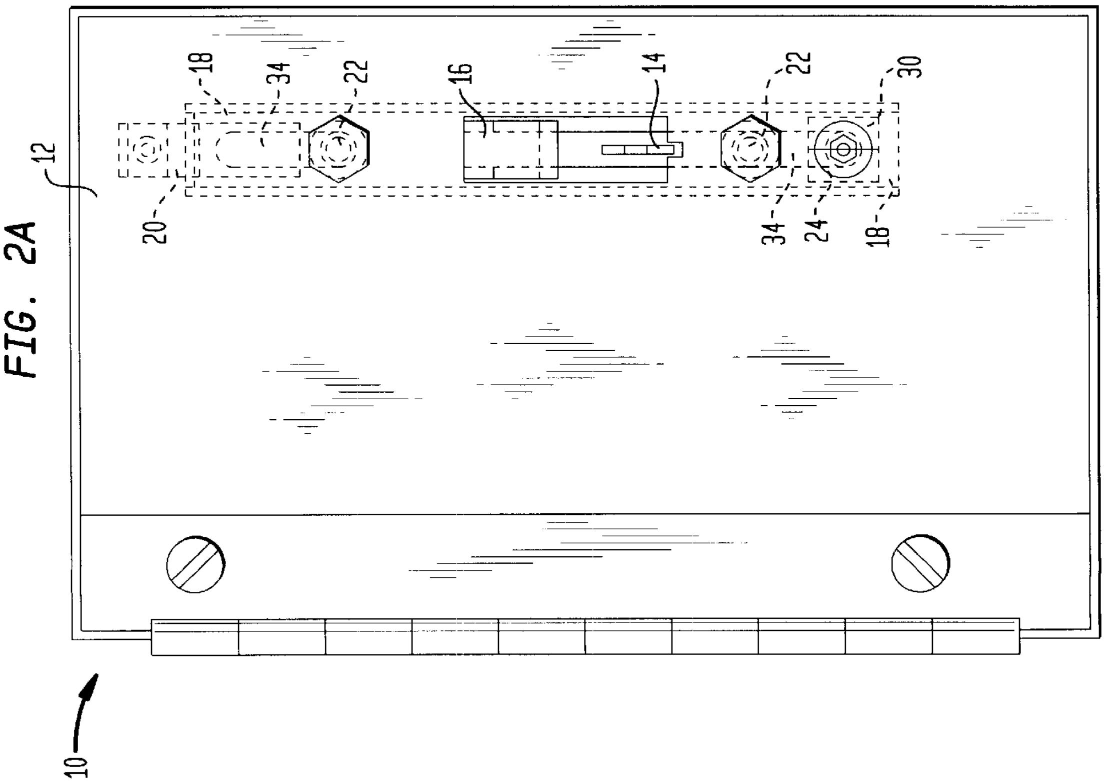
FIG. 2A is a front elevational view of the sliding security override system constructed in accordance with a preferred embodiment of the present invention mounted to a utility box and with the system in its open position.

FIGS. 1A through 2B depict a sliding security override system constructed according to a preferred embodiment of the present invention. The security override system generally includes a fixed one sided hasp portion 14 mounted within a utility box 10 and extending through an opening 60 in outer door 12 of utility box 10. Fixed hasp portion 14 is constructed to mate with a slideable one-sided hasp portion 16, preferably generally L-shaped when viewed from the side (FIGS. 2B, 4), and generally shaped as an inverted U when viewed from it front (FIGS. 5 and 6), which is connected to a bracket 18 which is in turn mounted to the inside surface of outer door 12 of utility box 10. The slideable hasp/bracket is movable between an open and a closed position with respect to the fixed hasp portion 14. When slideable hasp portion 16 is in its closed position it mates with, and partially covers (FIGS. 1B, 6) fixed hasp portion 14 and forms a padlock receiving section 26 therebetween (FIG. 1B), giving the impression of a conventional padlock hasp. When slideable hasp portion 16 is in its open position there is a space between slideable hasp portion 16 and fixed hasp portion 14 such that a locked padlock can be passed therebetween (FIG. 2B). The hasp portions, and utility box, can be constructed of any number of materials, such as, by way of a non-limiting example, metal or plastic, or any other material having the necessary rigidity and strength characteristics to fulfill the functions described herein.

Figure 3:
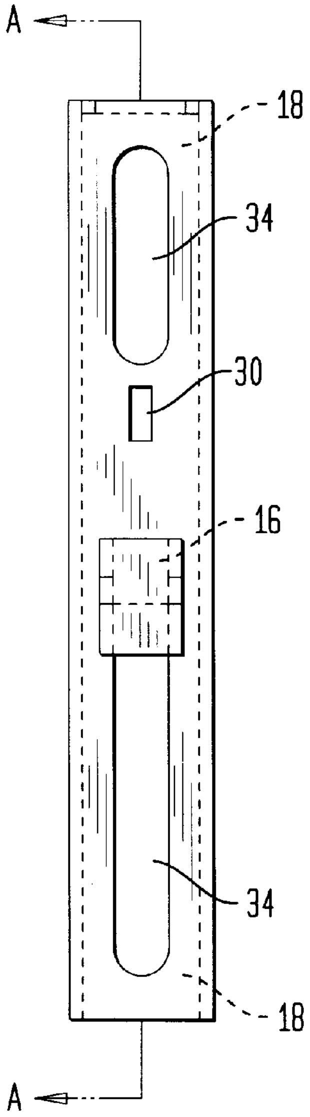
FIG. 3 is a front view of the slideable hasp/bracket portion of the sliding security override system.
Figure 4:
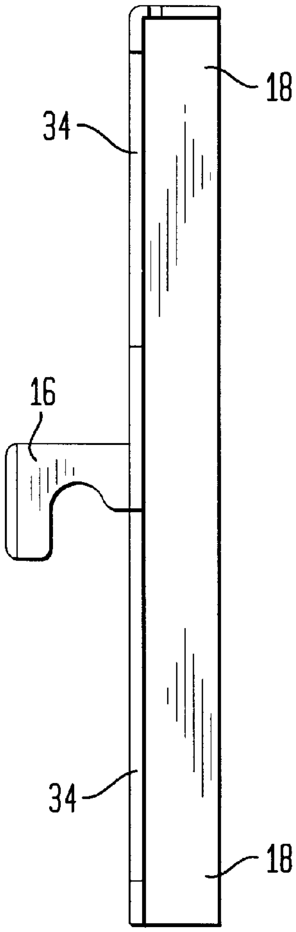
FIG. 4 is a side sectional view taken along line A—A of FIG. 4.
Figure 5:
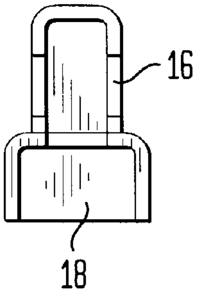
FIG. 5 is a bottom view of the slideable hasp/bracket portion of the sliding security override system.

As seen in FIGS. 3–5, hasp portion 16 is connected to a generally U-shaped bracket 18 at the approximate center of the longitudinal length of bracket 18 and extends substantially perpendicular to the longitudinal length of bracket 18. Bracket 18, and hasp portion 16 connected thereto, is slideably mounted to the inside of outer door 12 of utility box 10, and hasp portion 16 extends through a portion of opening 60 in outer door 12 of utility box 10. Hasp portion 16 is slideable between a closed position and an open position. Bracket 18 has two oval cutouts 34 to accept two corresponding guide bolts 22 which are attached to the inside surface of outer door 12. The bracket 18, and corresponding hasp portion 16, is guidedly moved between its open and closed positions by the interaction of guide bolts 22 and the corresponding oval cutouts 34. It will be appreciated by one skilled in the art that the shape of the hasp and bracket could be varied as a matter of design choice without departing from the spirit of the invention. Further, the guiding of the bracket from its closed to open position could be accomplished in any number of ways without departing from the spirit of the invention. Thus, for example, the guided movement of bracket 24 may be achieved in other art-recognize manners, such as via guide channels or rails or the like.

As seen in FIG. 1B, a spring 20 is attached to the inside of outer door 12 at one end of bracket 18. Spring 20 biases bracket 24 towards its closed position. Spring 22 may be any type of biasing member, such as the elastic tab shown or it may be a coil spring, or elastic rod, rubber band or the like, provided it biases bracket 24 towards its closed position. A security screw 24, by way of a non-limiting example a KS/216 screw, is mounted on outer door 12 of utility box 10. Security screw 24 extends through an opening 62 in outer door 12 and through oval cutout 34 in bracket 18. Security screw 24 has a contacting nut 28, a washer 30 and a lock nut 32 on the far side of bracket 18. Security screw 24 can be loosened whereby bracket 18 is slideably movable, or security screw 24 can be tightened whereby bracket 18 is immovable. Security 24 is preferably any type of screw that requires a non-standard tool to operate, although any standard art-recognized screw or bolt may be utilized. When a standard screw is utilized, additional screws 300 (FIG. 1) may be employed to further disguise the special purpose of screw 24. One skilled in the art will recognize that security screw 24, which acts as the means for permitting movement of bracket 18, could be constructed in a variety of shapes and sizes and mechanisms to facilitate controlled movement of bracket 18 from outside door 12 without departing from the spirit of the invention, such as, for example, through the use of other types of bolts known in the art, gears, locks, keyed cylinders, barrel locks, or the like.

As seen in FIGS. 1B and 2B, an oppositely facing one-sided fixed hasp portion 14 is fixedly mounted to a rear wall or other suitable surface within utility box 10 and extends through opening 60 in outer door 12 of utility box 10 to mate with sliding hasp portion 16 connected to bracket 18. When sliding hasp portion 16 is in its open position (FIG. 2B), there is a gap between sliding hasp portion 16 and fixed hasp portion 14 such that a locked padlock (not shown) can pass between them. When sliding hasp portion 16 is in its closed position (FIG. 1B), it mates with fixed hasp portion 14 to form a padlock receiving section 26 to receive an unlocked padlock (not shown) therethrough.

Figure 7:
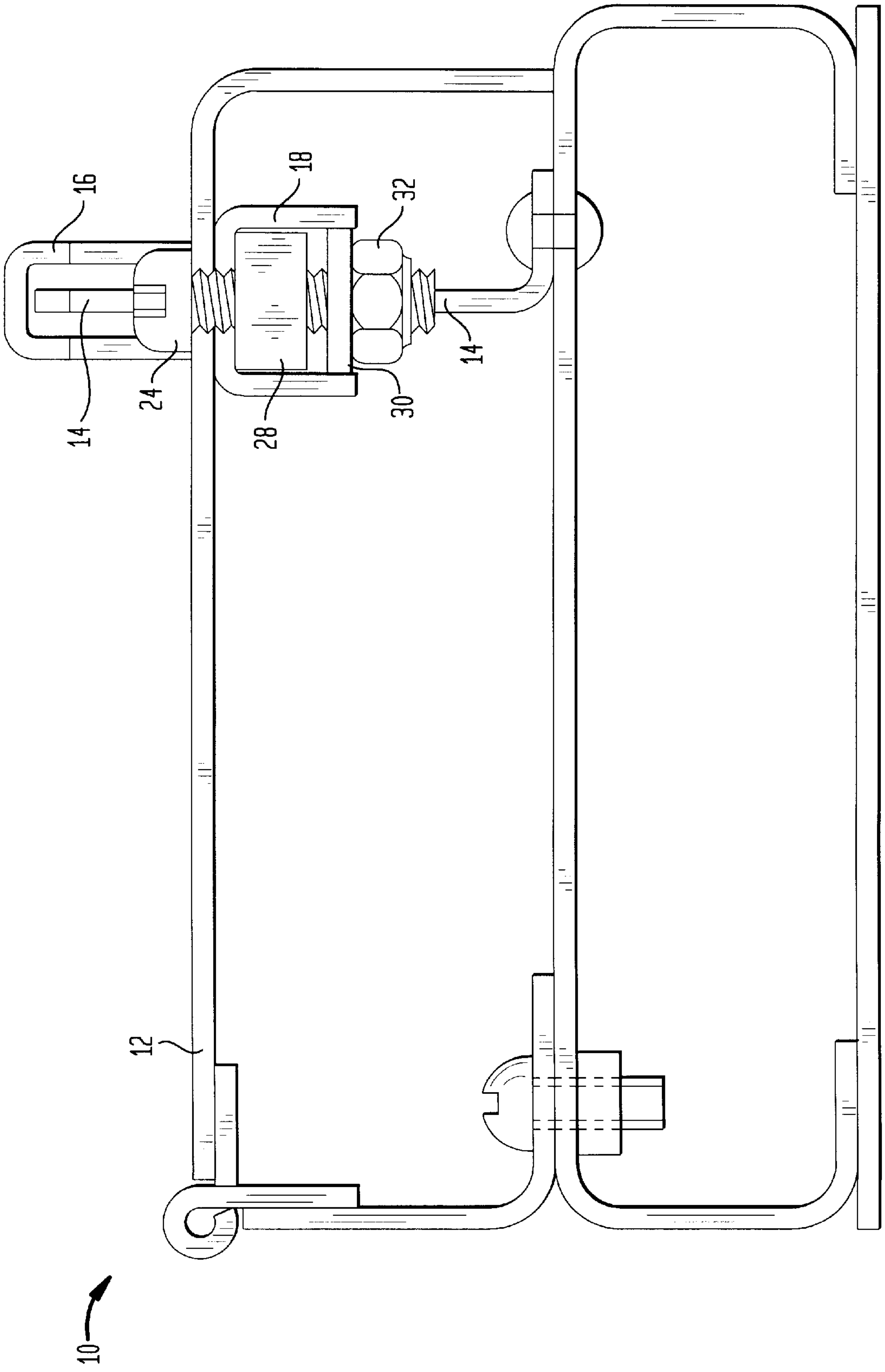
FIG. 7 is a bottom cutaway view of the sliding security override system depicted in FIG. 1B.

As seen in FIG. 7, when outer door 12 is closed and sliding hasp portion 16 is in its closed position mating with fixed hasp portion 14, an unlocked padlock (not shown) can be inserted through padlock receiving section 26 formed thereby and thereafter locked. The locked padlock (not shown) is therefore between outer door 12 and the two mating hasp portions 14 and 16, thus preventing outer door 12 from opening.

As seen in FIG. 1A, when sliding hasp portion 16 is in its closed position and the locked padlock (not shown) is installed in padlock receiving section 26, it would appear as though outer door 12 cannot be opened without first unlocking and removing the padlock (not shown). Of course, outer door 12 could be opened by unlocking and removing the padlock without having to loosen security screw 24. However, as shown in FIG. 2B, the security mechanism can be overridden by the technician or building owner by loosening security screw 24 such that contacting nut 28 does not contact bracket 18 and then moving sliding hasp portion 16 to its open position and passing the locked padlock (not shown) through the opening between fixed hasp portion 14 and sliding hasp portion 16.

Figure 6:
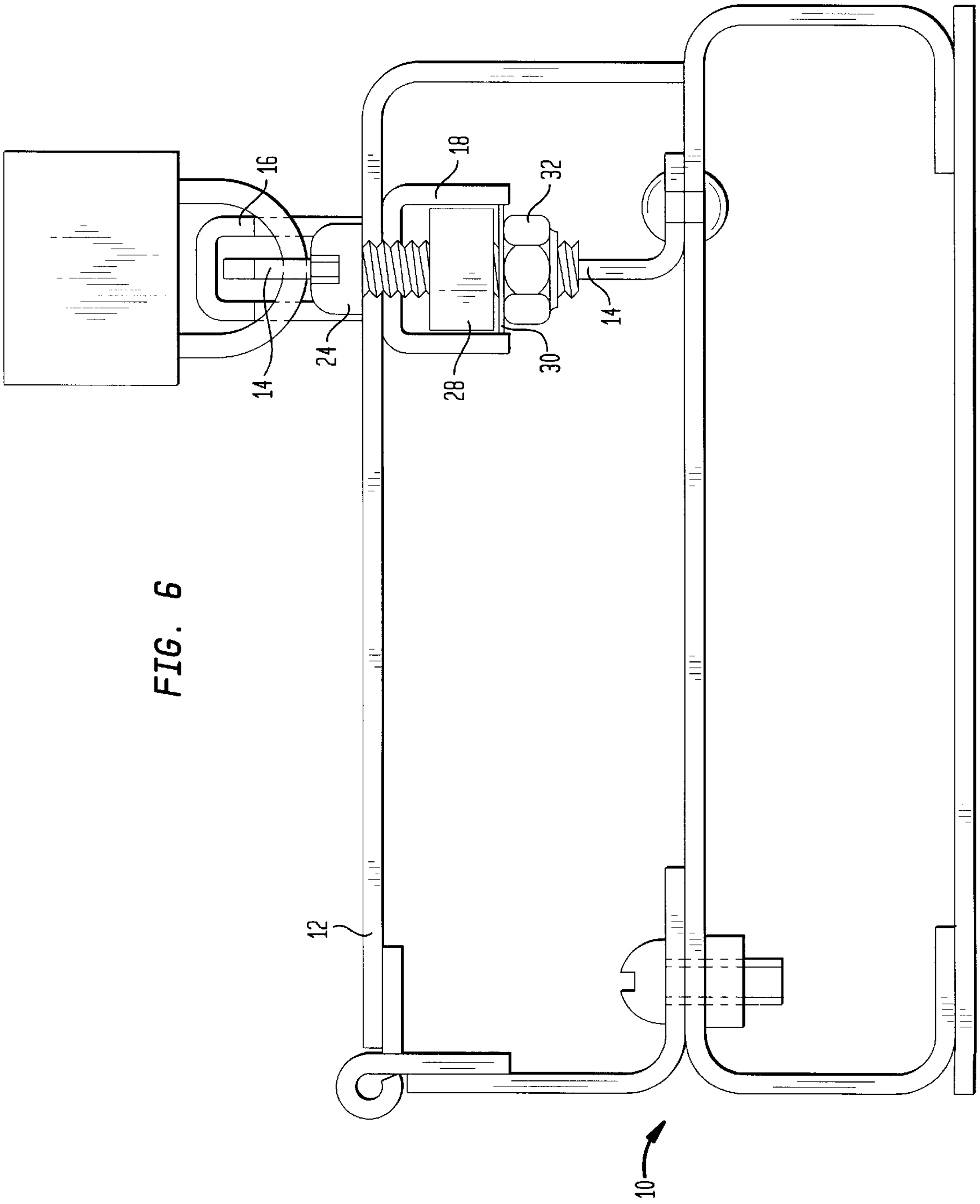
FIG. 6 is a bottom cutaway view of the sliding security override system depicted in FIG. 2B.

As seen in FIGS. 6 and 7, security screw 24 can be accessed and turned from outside utility box 10. By loosening security screw 24, the bracket and sliding hasp portion are movable between an open and closed position. When security screw 24 is loosened (FIG. 6), contacting nut 28 does not contact bracket 18 and therefore bracket 18 is movable. Thus, although spring 20 biases bracket 18 and hasp portion 16 to their closed position, when security screw 24 is loosened, the technician can slide hasp portion 16 to its open position and remove the locked padlock (not shown) and open outer door 12. When security screw 24 is tightened (FIG. 7), contacting nut 28 contacts a rear surface of bracket 18 and frictionally maintains bracket 18 in its closed position such that outer door 12 can only be opened by first unlocking and removing the padlock (or cutting the padlock off). Thus, while utility box 10 looks as though it cannot be opened without first unlocking the padlock, the technician knowledgeable in its construction can open outer door 12 without first unlocking the padlock. Also, should the key to the padlock become lost, the building owner can open the utility box without having to cut off the padlock. It will be appreciated to one skilled in the art that the placement and type of security screw used is merely a matter of design choice and that alternate placement or types of screws or other devices does not depart from the spirit of the present invention. It will also be appreciated to one skilled in the art that to the ordinary observer that the security screw would not appear to serve any function in the opening of the utility box. That is, it would not be apparent to the ordinary observer that the security screw could be used to open a locked utility box.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A security override system for a lockable box comprising:

a first hasp portion adapted to be mounted within a box and adapted to extend through a first opening in an outer door of said box;

a second hasp portion connected to a bracket adapted to be slideably mounted within said box such that said second hasp portion extends through said first opening in said outer door;

said bracket being movable between a closed position wherein said second hasp portion mates with said first hasp portion to form a padlock receiving portion and an open position wherein said second hasp portion does not mate with said first hasp portion; and bracket control means adapted to be mounted to said outer door at a distance from said first and said second hasp portions for releaseably contacting and controlling the movement of said bracket such that securement of said outer door is controlled by operating said bracket control means so as to permit movement of said bracket into said open position for opening said padlock receiving portion to enable the selective insertion and removal of a locked padlock in said padlock receiving portion without first unlocking said padlock.

2. The security override system according to claim 1, wherein said bracket control means comprises a screw extending through a second opening in said outer door, wherein said bracket is movable between said open position and said closed position by loosening said screw from outside said box and is rendered immovable by tightening said screw.

3. The security override system according to claim 1, wherein said bracket comprises a cutout to accept a corresponding guide bolt adapted to be mounted to said outer door for supportedly guiding the movement of said bracket.

4. The security override system according to claim 3, further comprising a biasing member to bias said bracket toward said closed position.

5. The security override system according to claim 2, wherein said first hasp portion is a fixed single blade L-shaped hasp portion.

6. The security override system according to claim 5, wherein said second hasp portion is a dual bladed L-shaped hasp portion.

7. The security override system according to claim 6, wherein said system is adapted to be mounted to a utility box that is a Building Entrance Protector.

8. The security override system according to claim 1, wherein first opening comprises a first opening portion and a second opening portion, said first hasp portion adapted to extend through said first opening portion and said second hasp portion adapted to extend through said second opening portion.

9. A building entrance protector (BEP) with a security override system comprising:

an outer door;

a first hasp portion mounted within a box and extending through an opening in said outer door;

a second hasp portion connected to a bracket;

said bracket slideably mounted within said box such that said second hasp portion extends through said opening;

said bracket being movable between a closed position wherein said second hasp portion mates with said first hasp portion to form a padlock receiving section and an open position wherein said second hasp portion does not mate with said first hasp portion; and bracket control means mounted to said outer door at a distance from said first and said second hasp portions for controlling the movement of said bracket such that securement of said outer door is controlled by operating said bracket control means so as to permit movement of said bracket into said open position for opening said padlock receiving portion to enable the selective insertion and removal of a locked padlock in said padlock receiving portion without first unlocking said padlock.

10. The BEP according to claim 9, wherein said bracket control means comprises a security screw extending through a second opening in said outer door for releaseably contacting said bracket such that said bracket is rendered movable between said open position and said closed position by loosening said security screw from outside said box and is rendered immovable by tightening said security screw.

11. The BEP according to claim 10, wherein said bracket comprises a cutout to accept a corresponding guide bolt mounted to said outer door for supportedly guiding the movement of said bracket.

12. The BEP according to claim 11, wherein said bracket is biased toward said closed position.

13. The BEP according to claim 11, wherein said first hasp portion is a fixed single blade L-shaped hasp portion.

14. The utility box according to claim 13, wherein said second hasp portion is a dual bladed L-shaped hasp portion.

15. A method of overriding a security system for a locked box comprising the steps of:

(a) loosening a security screw, which is connected to an outer door of said box and extends through an opening in said outer door and extends through a slideable bracket, to release said bracket;

(b) moving a second hasp portion connected to said bracket and extending through an opening in said outer door of said box from a closed position, wherein said second hasp portion mates with a first hasp portion fixedly connected to said box and extending through an opening in said outer door of said box to form a padlock receiving portion, to an open position wherein said second hasp portion does not mate with said first hasp portion, said sliding of said bracket being governed by said security screw; and (c) removing a locked padlock inserted in said padlock receiving portion without first unlocking said padlock and opening said outer door.

16. A security override system for a box with an outer door held shut by a locked padlock comprising:

a fixed hasp portion adapted to be attached within a box and adapted to extend outside said box through an opening in an outer door;

a slideable hasp portion adapted to be mounted to said outer door and movable between a closed position, wherein said slideable hasp portion mates with said fixed hasp portion to form an opening for an unlocked padlock to be passed therethrough, and an open position wherein there is a gap between said slideable hasp portion and said fixed hasp portion such that a locked padlock can pass therethrough;

a security screw adapted to be mounted to said outer door and turnable between a tightened position and a loosened position;

wherein said security screw prevents said slideable hasp portion from being moved from said closed position to said open position when said security screw is in said tightened position; and wherein said slideable hasp portion is movable from said closed position to said open position when said security screw is in said loosened position such that said locked padlock can pass through said gap between said slideable hasp portion and said fixed hasp portion and said outer door can be opened without having to first unlock said locked padlock.

17. The security override system according to claim 16, wherein said slideable hasp portion is attached to a bracket, said bracket adapted to be slideably mounted within said box such that said slideable hasp portion extends through an opening in said outer door.

18. The security override system according to claim 17, wherein said bracket comprises a cutout to accept a corresponding guide bolt adapted to be attached to said outer door.

19. The security override system according to claim 18, wherein said bracket is biased toward said closed position.

20. The security override system according to claim 19, wherein said fixed hasp portion is a single blade L-shaped hasp portion.

21. The security override system according to claim 20, wherein said slideable hasp portion is a dual bladed L-shaped hasp portion.

* * * * *